June 29, 1965  F. T. SPENCER  3,191,258
METHOD OF MAKING SHED-PROOF NAPPED FABRIC
Filed Dec. 6, 1961 2 Sheets-Sheet 1
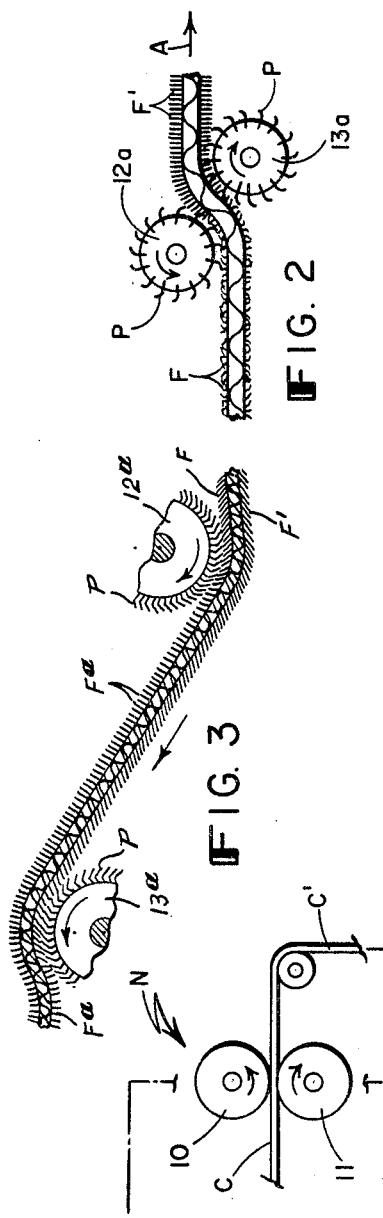
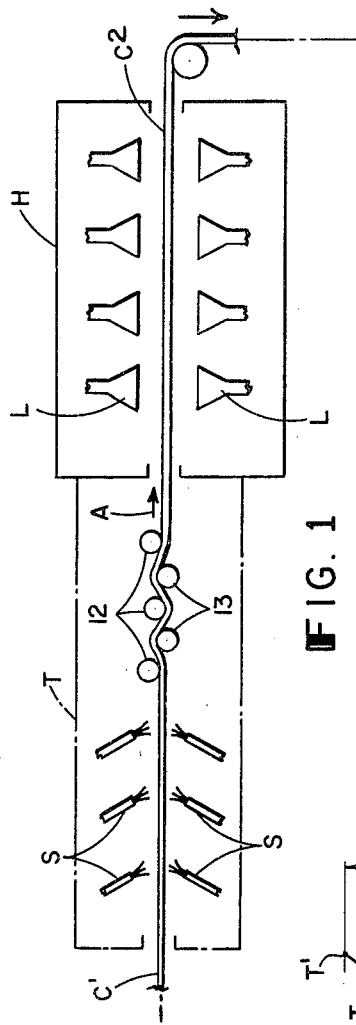
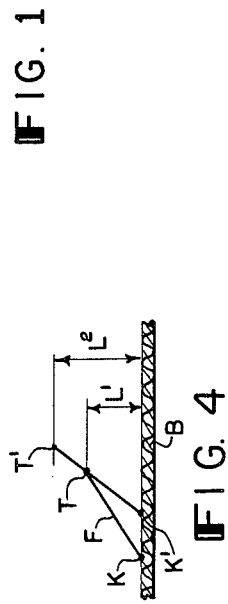
INVENTOR.
*Francis T. Spencer*
BY
*Roberts Cushman & Grover*
ATTYS.

3,191,258
METHOD OF MAKING SHED-PROOF
NAPPED FABRIC
Francis T. Spencer, Biddeford, Maine, assignor to Pepperell Manufacturing Company, Boston, Mass., a corporation of Massachusetts
Filed Dec. 6, 1961, Ser. No. 157,487
15 Claims. (Cl. 28—74)

The present application is a continuation-in-part of application for Letters Patent, Serial No. 83,538, filed January 18, 1961, by Francis T. Spencer for Napped Fabric and Method of Making the Same, and upon which a Patent No. 3,037,262, entitled "Shed-Proof Napped Blanket Fabric" issued on June 5, 1962.

This invention relates to a novel method of preparing napped or similar fabric thereby to impart thereto certain useful characteristics, some of which have been recognized heretofore as desirable, but which have not been commercially attainable, at least as respects fabric wherein the nap is predominantly of certain specific materials. Among such useful characteristics as respects napped textile fabrics are resistance to shedding, flame-resistance, resistance to wetting, and crush-resistance.

For the attainment of the above desired characteristics, it has heretofore been proposed to treat the nap layer of the fabric as, for example, by spraying it with a liquid of a kind such as chemically or physically to change the character of the individual fibers; to cause adjacent fibers, where they contact, to coalesce; or to form a coating upon the individual fibers which may or may not cause the fibers to adhere to each other, and then allowing or causing the treating medium to dry, cure or set. While such treatment of the nap of certain fabrics has given good results, particularly when the result may be obtained by the employment of very dilute or low viscosity fluid, it has been found almost impossible to attain the useful effects in many cases, since the aforesaid treatment may fail completely when applied to certain materials, or in other cases has the ultimate result of making the fabric dense and felt-like; of decreasing the loft or height of the nap; or of producing a nap having a crust-like surface having a distinctly different appearance and/or feel from that which is demanded in the intended field of use of the material.

Various substances have been employed in treating napped material, among them latex rubber or rubber compound, and certain of the synthetic resins, while others are solution of inorganic salts. Thus, as flame-retardant materials for cotton, certain polymers made by reacting tris (1-aziridinyl) phosphine oxide, referred to as APO, or tris (1-aziridinyl) phosphine sulfide, referred to as APS, with tetrakis (hydroxymethyl) phosphonium chloride, referred to as THPC have been employed. As water repellants for cotton, substances such as ODI (octadecyl isocyanate) have been employed, and for crush-resistance the so-called "Rohnite" resins (which are water-soluble urea formaldehyde resins), and the so-called "Safe-Te-Set" resins (which are cyclic urea resins), which are applied in water solution, have been used.

While the basic method, herein disclosed and claimed, may be found useful in the treating of napped or similar fabrics, for any of the above-named purposes and by the employment of appropriate reagents such as mentioned, or others having similar capabilities, the invention is herein more specifically described in its relation to the prevention of, or substantial reduction in the shedding of nap during customary use, or as the result of laundry treatment. While herein the term "napped fabric" is employed for convenience, it is to be understood that this term is not to be restricted to a fabric having a layer of upstanding fibers such as produced by passing a woven fabric through a conventional napping machine, but is to be considered as broadly inclusive of high-pile fabrics such as plushes and artificial furs made from textile materials. However, the invention is herein described by way of specific example as applied to the manufacture of a non-shedding household blanket.

Since certain of the synthetic fibers have, in recent years, been widely adopted in blanket manufacture, and because some of such fibers are very slippery and more prone to shedding when constituting a nap than the natural fibers, interest in the reduction of shedding of blanket fibers has been intensified.

A principal object of the invention is to provide a novel method of preparing a truly shed-proof blanket whose nap is predominantly of cellulosic fiber, for example rayon, which suffers no apparent loss of loft by reason of the treatment to which it is subjected in making it shedproof, wherein the body of the fabric is substantially unchanged in character by reason of the treatment to which the nap is subjected, and whose fell and appearance as compared with a freshly napped blanket, are not substantially modified, or may even be improved. A further object is to provide a novel and commercially practical method of making a shed-proof napped fabric. A further object is to provide a novel method of treating napped fabric, in particular, fabric wherein the nap comprises a substantial percentage of a synthetic fiber, for example cellulosic fiber, whereby the material becomes shedproof with improved loft or appearance, as compared with the fabric when freshly napped. A further object is to provide a method of treating napped blanket cloth wherein the nap consists, in substantial proportion, of synthetic fiber, for example rayon, or of natural vegetable fiber, for example cotton, whereby the shedding of nap during the ordinary use of the cloth is greatly reduced as compared with untreated cloth of the same type. A further object is to provide a novel method of treating napped woven fabric, including fabric wherein the nap consists of predominantly rayon, thereby to make the fabric shed-proof. A further object is to provide a method of treating napped fabric so as to make it substantially shed-proof, which comprises as steps: spraying the previously napped fabric with a liquid of very low viscosity and of a type which does not chemically or physically modify the fiber, but which, by heat treatment, becomes sticky and then sets to form a bond for connecting adjacent fibers; mechanically agitating the wetted nap to facilitate the penetration of the liquid throughout the entire thickness of the nap layer and then heating the material until the coating sets and bonds the fibers together. A further object is to provide a novel method of treating napped fabric thereby to make it substantially shed-proof, which comprises as steps: applying a liquid reagent, as a spray, to the nap layer of the fabric, so as to coat the individual fibers, but without changing the chemical composition of the fibers, raising the nap while wet with the liquid, thereby to restore the nap fibers substantially to the positions which they occupied immediately after napping, and so heat-treating the fabric as to cause the coating to set and bond adjacent fibers together. A further object is to provide a novel method of making napped fabric shed-proof, and wherein the napped fabric, while held in a substantially horizontal plane and under widthwise tension, is sprayed with a liquid thermosetting bonding reagent; so as to coat the individual fibers; raising the nap fibers, while still wet with the reagent, so as to place them substantially vertical with respect to the horizontal plane of the body of the fabric; and then baking the fabric to set the reagent. A further object is to provide a novel method of making shed-proof blanket fabric which includes the preliminary step of so napping conventional blanket cloth that the nap fibers, on both sides of the material, slope in the same direction thereby to facilitate the application of the shed-proofing treatment to both sides of the blanket simultaneously as the fabric is continuously advanced. A further object is to provide a novel method of shed-proofing blanket fabric wherein the fabric, as a preliminary to the shed-proofing treatment, per se, is reduced in width, concomitantly with napping, to approximately 90% of the desired finished width, and, after the nap has been wetted with the coating reagent, the fabric is stretched widthwise to the desired finished width while the coating reagent is setting. A further object is to provide a novel method of preparing a substantially shed-proof napped fabric wherein adjacent nap fibers are bonded together by a material other than the substance of the fiber itself, and wherein individual nap fibers occupy approximately the same relative positions as they did in the fabric at the completion of the napping operation. A further object is to provide a method of preparing a shed-proof blanket which is free from any chemical substance which might be harmful to a small child who might chew or suck the fabric. A further object is to provide a method of making a napped blanket fabric wherein the nap is predominantly cellulosic and which is shed-proof.

Other and further objects and advantages of the invention will be pointed out in the following more detailed description and by reference to the accompanying drawings wherein:

FIG. 1 is a diagrammatic elevation or flow-sheet, illustrative of the successive steps in the process;

FIG. 2 is a fragmentary vertical section, to larger scale than FIG. 1, illustrative of the step of raising the nap fibers while they are still wet with a treating liquid;

FIG. 3 is a fragmentary, diagrammatic view, generally similar to FIG. 1, but to larger scale and illustrative of the actual arrangement of the nap fibers as the fabric approaches the nap-agitating device;

FIG. 4 is a diagram illustrative of a suggested theory of operation; and

Figure 5:
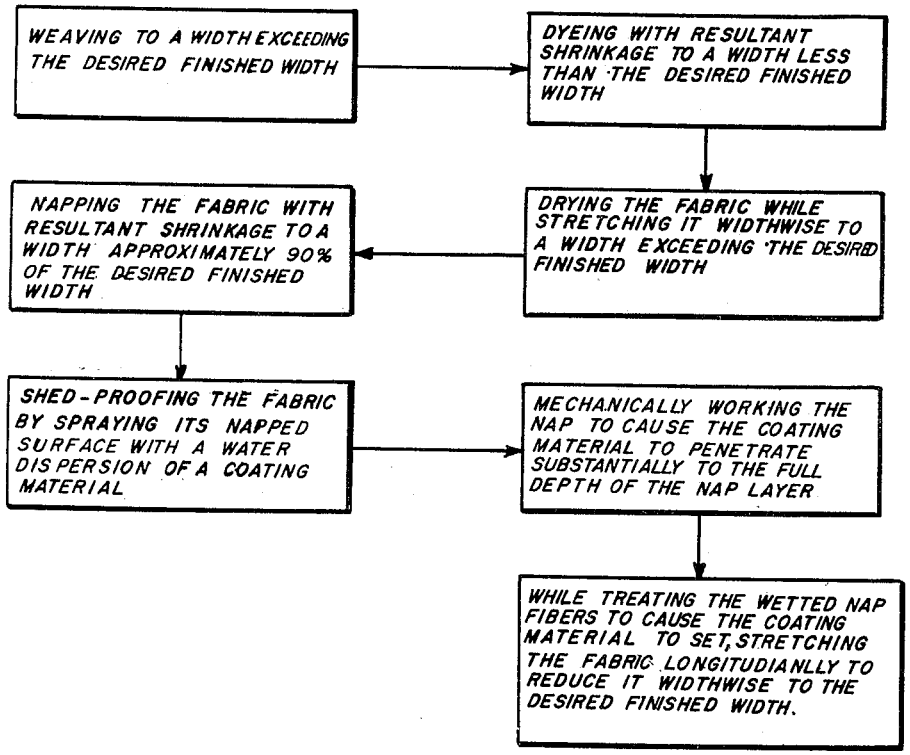
FIG. 5 is a flow chart illustrative of one desirable sequence of operations.

During the research which resulted in the present invention, it was discovered that when napped fabric, wherein the nap was predominantly of acrylic material such, for example, as Acrilan, was first sprayed with a certain acrylic emulsion in water dispersion so as to coat the nap fibers, and then the fabric was baked at a temperature of approximately 300° F., a coating was formed upon the nap which permanently bonded adjacent fibers to each other to an extent such as substantially to reduce the shedding of the nap when the fabric was exposed to conditions simulating those of blanket fabric under ordinary conditions of use. The chemical employed did not alter the chemical structure or physical properties of the individual fibers and since, after heat-treatment, it was completely insoluble in water, the finish thus provided became a permanent part of the blanket and continued to oppose shedding throughout the useful life of the fabric. It may be noted that acrylic fibers have a natural resiliency, not possessed by cellulosic fibers and are hydrophobic in nature, and because of these two qualities, treated acrylic blankets are not altered perceptibly in appearance as compared with the untreated fabric and retain their original loft and resilience so that sales appeal is not lessened by reason of this particular treatment.

Experiments with blanket cloth made predominantly of cellulosic fibers and subjected to the above treatment, are also, to a certain extent, shed-resistant. However, it was observed that blankets, so treated, showed a tendency to lose the initial lofty appearance and feel of the untreated fabric as it exists when the initial napping has just been completed. Such a blanket, while useful for its intended purpose, did not have an appearance such as to recommend it to the purchaser. In the effort to make a cellulosic nap fully shed-resistant, it was proposed to modify the above treatment by increasing the concentration of the chemical. This was carried out to the point at which a crust of chemical was formed on the opposite faces of the blanket. While the resultant fabric was actually shed-proof, it had lost loft, that is to say, the thickness of the nap layer was less than in the untreated fabric, while the presence of the crust imparted an appearance and feel suggestive of materials heretofore proposed for blankets, but which are in the much lower price range as compared with blankets of napped woven textile fabric. Attempts to dispose of this crust so as to restore the feel and appearance of the original napped fabric, as by breaking up or otherwise modifying or removing this crust, after once having been formed, were wholly unsuccessful. Even though the treated material was again passed through the napping machine, the resultant fabric did not have the same appearance as when first napped and, moreover, the action of the napping machine was such as to break the bond which had been provided between the nap fibers, so that the net result was to produce a material which was inferior to the original untreated napped fabric. The desired results were eventually attained by first spraying the napped material with the selected chemical, as above described, but at a concentration lower than such as would form a crust; then, while the material was still wet with the spraying material, raising the nap to its original height or even higher, and then, without applying pressure (as by passing the material between rollers), subjecting it to a heat-treatment whereby the nap fibers, in their raised position, were bonded together by the coating chemical so that the blanket became shed-proof and had a feel and appearance, but little different and, if anything, with a higher loft and softer feel than a napped blanket which had just passed through the napping machine.

Referring to the drawings, the character N indicates, in a diagrammatic manner, a napping machine of ordinary type, wherein the woven cloth C passes between rolls 10 and 11, one of which is clothed with the usual pin-covered napping fabric (not shown) which, by engagement with the yarns forming the initial woven cloth, raises some of the constituent fibers of the yarns to form a nap. The nap fibers, as produced by the usual napping machine, are not perpendicular to the face of the body fabric but predominantly slope or lean in one direction. In customary napping practice, the nap fibers at opposite sides of the napped fabric slope in opposite directions. In accordance with a preferred embodiment of the present invention, and as a preliminary step, the cloth is so manipulated, during napping, that the nap fibers at both sides of the cloth slope in the same direction. This cloth $C^1$, with nap at its opposite surfaces, is then desirably temporarily stored in any convenient way in readiness for the novel treatment according to the present invention. For example, the cloth may be laid in folds upon a truck, or in a box or other portable container and, in this condition, moved to the vicinity of the treating apparatus. As diagrammatically illustrated in FIG. 1, the treating apparatus desirably comprises a conventional tenter frame T having the customary parallel, constantly travelling chains (not shown), provided with pins or clamps which engage the opposite selvage edges of the fabric and hold the fabric under transverse tension while moving it along progressively, in the direction of the arrow A. In accordance with the present invention, the fabric is so fed into the tenter frame that the ends of the sloping nap fibers at both sides are directed forwardly, with the napped surface in a horizontal plane, and out of contact with solid rollers, or any other elements such as would tend to crush or compress the nap. As the fabric is so moved, spray heads S, of any suitable type, and which are supplied with the coating material under pressure, deliver this material as a liquid spray against the opposite faces of the fabric. One material which has been found emminently suitable for the purpose is an aqueous dispersion of an acrylic polymer known to the trade as Rhoplex HA–8, which is made by the firm of Rohm & Haas of Washington Square, Philadelphia 5, Pennsylvania. Materials of this class are described in the Supplement to the 1953 Edition of "Handbook of Materials and Trade Names," (published by Industrial Research Service, Dover, New Hampshire), under the generic name Rhoplex Emulsion, an aqueous dispersion of acrylic polymers which, when deposited from dispersion in water, forms a transparent film. Another resin having similar properties is Wicaset WA–89 manufactured by Wica Chemical, Inc.

Apparatus useful in the practice of the present invention is disclosed and claimed in the patent to Spencer, No. 3,068,836, dated December 18, 1962, in which reference is made to applicant's prior patent, No. 3,037,262, dated June 5, 1962, above referred to.

In accordance with the present invention, the dispersion of this chemical in water is within the range of 93% to 98½% water and from 1½% to 7% chemical. However, it is contemplated that this range may be extended slightly in either direction. As applied in this dilution, the chemical is not appreciably sticky, so that it flows freely and is readily absorbed by the nap layer. The liquid dispersion is applied to the cloth within the range of from 2% to 5% by weight of chemical to cloth and, here again the range may be varied slightly up or down. It may be noted that in thus applying the treating fluid by means of a spray, the body of the fabric is not impregnated and substantially retains its original characteristics as when woven.

The fabric, after having been sprayed in this manner, is advanced (FIG. 1) still with the free ends of the nap fibers directed forwardly, between freely rotatable, nap-lifting rollers, one or more rolls 12 being above the cloth and one or more rolls 13 being below it, and with their axes so arranged that the cloth must follow a sinuous path in passing from an upper to a lower roll. Rolls of four inches, extreme outside diameter, have been found useful for the purpose, although it is contemplated that rolls of other sizes may be employed, it being advantageous to use rolls of such size and so arranged as to provide a substantial period of contact of the cloth with the rolls. These rolls, as illustrated diagrammatically and to larger scale in FIG. 2, have cylindrical cores covered, for example, with napper-roll cloth, using pins P of the elbow type having a 45° bend, but it is contemplated that other types of pins may be found useful. Upper and lower rolls, as shown at 12a and 13a in FIG. 2, are so arranged that the points of their pins are directed toward the oncoming fabric, it being noted that the fabric is continuously advanced by the chains of the tenter frame in the direction of the arrow A (FIG. 1), with the free ends of the nap fibers directed forwardly. The rolls are free to turn and are turned only by the frictional drag of the cloth.

As illustrated in FIG. 3, the nap fibers F and F¹, at opposite sides of the fabric, have their free ends directed forwardly and the fabric advances toward the first roll 12a.

As the cloth progresses, the tips of the pins P enter between the free ends of the nap fibers and so separate and agitate the nap fibers as to induce the liquid to enter more deeply into the nap layer. Then, as the rolls turn, and the angle of the pins changes, in relation to the plane of the advancing cloth, they tend to raise the nap, that is, to move the pile fibers into perpendicularity relatively to the body of the fabric, as shown at Fa (FIG. 3), resulting in a smooth even surface and a loftier nap than results from the conventional napping operation. Since the slope of the nap fibers is in the same direction on both faces of the fabric, the oppositely turning rolls 12 a and 13a produce the same effect at both sides of the fabric.

After leaving the rolls 12 and 13, the fabric is advanced by a conventional tenter frame (not shown), through a housing H having therein any suitable type of heating means, here illustrated as infrared lamps L, the treating chamber being long enough so that the liquid carrier for the chemical is gradually evaporated. A minimum temperature in the heating chamber of approximately 250° F. is useful for the purpose, although it is preferred to increase the temperature to approximately 300° F. to speed up the operation. As the fabric C² travels through the heating zone, and the water evaporates, the chemical concentrates and first forms a sticky coating on the nap fibers so that adjacent fibers, where they contact, adhere to each other, and then sets to form a permanent bond.

Customarily in the preparation of napped blanket cloth and in order to compensate for the widthwise shrinking and elongation of the fabric, which is concomitant to some of the steps involved, the fabric is originally woven to a width substantially greater than the desired finished width of the fabric. Merely for simple illustration, and without suggestion that the dimensions mentioned are those which would be employed in any particular case, and assuming that the blanket when finished should be 72 inches wide, experience might indicate that the initial width, as woven on the loom, should be 84 inches. During the dyeing of the material shrinkage would take place such that the width of the wet material might be no more than from 66 to 68 inches. The material would then be dried, for example, on a tenter frame and, in so drying, it would be stretched widthwise to approximately 78 inches and then in the following napping process the longitudinal tension would bring the width down to 72 inches desired for the finished fabric.

Preferably, in the practice of the present method for shed-proofing and using the same dimensions as in the above example, the stretching on the tenter frame, while drying the material after dyeing, would be only to a 75 inch width, that is to say, 3 inches less than in accordance with previous practice, and during napping the material is so stretched longitudinally as to bring the width down to approximately 65 inches. At this width the material is subjected to the treatment to prevent nap shedding and during the final heat-treatment for setting the coating material, the width is brought back to the desired final finished width of 72 inches.

It has been found that, by shrinking the width during napping to an abnormal extent and then bringing it back to the finished width during the completion of the shed-proofing treatment, the loft of the nap in the finished blanket is greater than though the material was not abnormally shrunken widthwise during napping. It is not known with certainty why this result is thus attained, although it seems quite possible that the stretching of the fabric during the treatment, and particularly after the fibers begin to stick together, causes the fibers, or at least some of them, to rotate about their points of connection to the body fabric into a more nearly upright position than results from the action of the rolls 12a and 13a. As diagrammatically illustrated in FIG. 4, the fabric body is indicated at B and a fiber F is shown as projecting from the body K and terminating at the point T (which would normally indicate the upper level of the nap, that is to say, its loft $L^1$ or height above the upper surface of the body portion). In stretching the material so that the point K moves to the point $K^1$, and assuming that because of the presence of adjacent fibers (not shown), but which are adhering to the upper portion of the fiber F, the tip of the given fiber would not move lengthwise of the fabric, any movement of the base of the fiber from K to $K^1$ would tend to cause the selected fiber to rotate in a counterclockwise direction until its tip $T^1$ was located at a higher level, indicating a loft $L^2$ greater than the original loft $L^1$. However, this is advanced merely as an unproven theory to account for an observed result of the process as above described.

While the above mode of treatment is particularly useful for the treatment of rayon or other cellulose fibers, the mechanical agitation and raising of the nap while wet with the chemical, appears to improve the character of acrylic blankets, or other napped materials, beyond that which is the result of previous methods of treatment for the prevention of nap shedding (whether by the use of the above acrylic polymer emulsion, or other chemicals).

The result of this treatment not only makes the material truly shed-proof without impregnating or otherwise changing the character of the body fabric, but appears to impart to the napped fabric a quality which has not heretofore been obtained by any previous method and it is contemplated that any napped fabric thus treated will have a loft and appearance superior to that of fabric which has been freshly napped but not otherwise treated.

While the method herein specifically described is such as to treat both sides of the napped blanket cloth simultaneously, it is within the purview of the invention to treat but one side for shed-proofing at a time and, in such event, only one of the rolls 12a and 13a would be provided with pins P. Moreover, if the fabric were thus to be handled there would be no particular advantage in so napping the material as to cause the nap fibers on both sides to slope in the same direction.

While one desirable embodiment of the invention and instrumentalities whereby it may be practiced has here been illustrated and described by way of example, it is to be understood that the invention is broadly inclusive of any and all modifications falling within the scope of the appended claims.

I claim:

1. That method of making shed-proof napped blanket fabric of a predetermined finished width which includes the steps of weaving the fabric to a width substantially exceeding the desired finished width, dyeing the fabric with resultant shrinkage to a width less than the desired finished width, drying the fabric while stretching it widthwise to a width exceeding the desired finished width, napping the fabric with resultant shrinkage to a width approximately 90% of the desired finished width, shed-proofing the napped fabric by spraying its napped surfaces with a dilute water dispersion of a coating material, mechanically working the nap to cause the coating material to penetrate substantially to the full depth of the nap layer and, while treating the wetted nap fibers to cause the coating material to set, stretching the fabric widthwise thereby to bring the same to the desired finished width.

2. That method of making shed-proof blanket cloth which is soft and drapeable and which comprises a body portion of woven fabric having a layer of nap fibers projecting from one side, at least, of the body fabric, the nap fibers being predominantly cellulosic, said blanket cloth being substantially the same with respect to appearance, feel, color and loft, and with the nap fibers as predominantly upstanding as when the cloth was freshly napped, the nap-forming fibers having the same chemical characteristics which they had in the fabric as woven, the individual fibers comprised in said nap layer being coated with a material which provides a permanent bond whereby adjacent nap fibers are permanently united so as substantially to prevent the shedding of the nap fibers during use of the blanket cloth while the body fabric is substantially free from said coating material, said method comprising as steps: advancing a conventional woven fabric having a layer of nap fibers, predominantly cellulosic, at one side, at least, of the body fabric and, while retaining, substantially unimpaired, the initial permeability of the woven body fabric, wetting the nap-forming fibers with a non-sticky liquid, comprising a resinous bonding material, which coats the fibers without modifying the chemical or physical characteristics of the fibers and without substantially wetting the body of the fabric with said liquid; introducing mechanical fiber-erecting elements into the layer of nap fibers while they are wet with the non-sticky liquid; so actuating said erecting elements as to urge the individual fibers toward perpendicularity with reference to the body of the fabric; and so treating the fabric, without substantially disturbing the erected fibers, as to concentrate the bonding material and cause it first to become sticky and then to set and permanently bond adjacent fibers together.

3. That method of making shed-proof blanket cloth which is soft and drapeable and which comprises a body portion of woven fabric with a layer of nap fibers projecting from one side, at least, of the body fabric, the nap fibers being predominantly cellulosic, the cloth being substantially the same with respect to appearance, feel, color and loft, and having the nap fibers as predominantly upstanding as when the cloth was freshly napped, and wherein the nap-forming fibers have the same chemical characteristics which they had in the fabric as woven, and wherein the individual fibers comprised in the nap layer are coated with a material whereby adjacent nap fibers are permanently united so as substantially to prevent the shedding of the nap fibers during use of the cloth, and wherein the body fabric is substantially free from said coating material, said method comprising advancing a conventional, woven fabric having a layer of nap fibers at one side, at least, of the fabric body, and, while retaining, substantially unimpaired the inherent permeability of the woven body fabric, applying, by spraying, to the nap fibers a thermosetting coating material, in dilute, non-sticky, aqueous dispersion, so that it coats the individual nap fibers and without substantially wetting the body of the fabric with said material, further advancing the fabric into the field of action of a toothed nap-raising device whose teeth penetrate the nap layer as the fabric advances and urge the individual fibers, while wet with said non-sticky dispersion, toward a position of perpendicularity with reference to the body of the fabric, and, while avoiding the application of pressure to the nap layer such as would compress the nap fibers, subjecting the fabric to heat thereby to cause the coating material to form a permanent adhesive bond between adjacent fibers.

4. That method according to claim 2, wherein the coating material is a synthetic resin in water dispersion.

5. That method according to claim 4, wherein the synthetic resin is dispersed in the water in the proportion of from 93% to 98½% water and from 7% to 1½% of the resin.

6. The method according to claim 5, wherein the water dispersion of the resin is applied to the fabric in the proportion of from 10% to 15% of liquid to dry fabric by weight.

7. The method according to claim 6, wherein the resin is an acrylic polymer having adhesive properties.

8. The method according to claim 6, wherein the synthetic resin is Rhoplex HA-8.

9. The method according to claim 2, wherein, for setting the coating material, the fabric is heated to a maximum temperature of the order of 300° F.

10. The method according to claim 2, wherein, for setting the coating material, heat is applied gradually whereby the material first becomes sticky so as to unite adjacent fibers, and then sets to form a permanent bond between adjacent fibers.

11. The method according to claim 2, wherein the liquid which is applied to the nap fibers is a non-sticky aqueous dispersion of an acrylic polymer, and the fabric is held under transverse tension while treating the fabric to cause the acrylic polymer to stick adjacent fibers together and thereafter set so as to form a permanent bond between adjacent fibers.

12. The method according to claim 3 wherein the nap fibers of the fabric are predominantly of rayon, and wherein the nap fibers are so separated and agitated by the teeth of said toothed device, while wet with the non-sticky liquid coating material, as to cause the liquid to penetrate substantially to the junction of the nap layer with the body fabric so as to coat the nap fibers substantially to their full lengths, and wherein the liquid coating material is a water dispersion of the acrylic polymer known as Rhoplex HA-8, said fabric being heated by advancing the fabric, while held by its edges and under transverse tension and with its nap layer free from contact with other parts, through a heating zone where it is subjected to such a temperature and for such a period of time that the acrylic polymer is concentrated and the coating upon the fibers first becomes adhesive and then forms a permanent bond between adjacent fibers.

13. The method according to claim 2, wherein the fabric has a layer of nap on each of its opposite faces, and the liquid, non-sticky bonding material is applied, as a spray, simultaneously to each of said nap layers to wet the individual nap fibers of both layers with said material and without substantially wetting the body of the fabric with said liquid.

14. The method according to claim 2, wherein the fiber erecting elements are pins of the elbow type mounted on a rotatable roll, and the fabric is advanced toward the roll so that the tips of the pins are directed toward the oncoming fabric and, in entering the nap layer, agitate the nap fibers thereby facilitating the penetration of the nap layer by the liquid, causing the roll to turn by the advancing motion of the fabric, thereby withdrawing the pins from the nap layer, whereby the wet nap fibers, in separating from the pins, are disposed in substantially upright position.

15. That method of making shed-proof blanket cloth which, when completed, is soft and drapeable and which comprises a body portion of woven fabric having a layer of nap fibers projecting from each side of the body fabric, the nap fibers being predominantly cellulosic, the cloth being substantially the same with respect to appearance, feel, color and loft, and having the nap fibers as predominantly upstanding as when the cloth was freshly napped, and wherein the nap-forming fibers have the same chemical characteristics which they had in the fabric as woven, and wherein the individual fibers comprised in the nap layer are coated with a bonding material whereby adjacent nap fibers are permanently united so as substantially to prevent the shedding of the nap fibers during use of the blanket cloth, and wherein the body fabric is substantially free from said coating material, said method comprising so napping a conventional, unnapped blanket fabric as to provide nap fibers on both sides, with the nap fibers on both sides sloping in the same direction, spraying the nap on both sides of the fabric with a dilute, non-sticky dispersion of resinous bonding material and without substantially wetting the body of the fabric with said material, so advancing the fabric, with the ends of the sloping nap fibers directed forwardly toward rotatable, toothed nap-raising rolls, that the teeth of the latter enter between the wet nap fibers at opposite sides, respectively, of the fabric thereby causing the rolls to turn and so withdraw the teeth from the nap layer and so raising the nap fibers to positions of substantial perpendicularity relative to the fabric body as the fabric continues to advance, and thereafter treating the fabric as to cause the bonding material to set.

References Cited by the Examiner
UNITED STATES PATENTS

| 415,009 | 11/89 | Van Den Esch | 26—2 |
| 600,676 | 3/98 | Menzie | 118—34 |
| 1,417,587 | 5/22 | Tully | 117—104 |
| 1,672,712 | 6/28 | Dulligan | 26—2 |
| 2,035,641 | 3/36 | Dickie et al. | 26—2 |
| 2,329,651 | 9/43 | Powers et al. | 117—66 |
| 2,390,386 | 12/45 | Radford | 28—73 |
| 2,510,313 | 6/50 | Houth et al. | |
| 2,590,713 | 3/52 | Libbey. | |
| 2,639,420 | 5/53 | Ehle | 117—11 |
| 2,970,363 | 2/61 | Krauss et al. | 26—2 |

OTHER REFERENCES

Acrylic Resins, by Milton B. Horn, Reinhold Publishing Corp., New York, copyright 1960, pp. 133–137.

DONALD W. PARKER, *Primary Examiner.*
RUSSELL C. MADER, MERVIN STEIN,
*Examiners.*